United States Patent
Dunn et al.

(10) Patent No.: US 6,781,699 B2
(45) Date of Patent: Aug. 24, 2004

(54) TWO-WAVELENGTH CONFOCAL INTERFEROMETER FOR MEASURING MULTIPLE SURFACES

(75) Inventors: Thomas J. Dunn, Penfield, NY (US); Andrew W. Kulawiec, Fairport, NY (US); Mark J. Tronolone, Fairport, NY (US)

(73) Assignee: Corning-Tropel, Fairport, NY (US)

( * ) Notice: Subject to any disclaimer, the term of this patent is extended or adjusted under 35 U.S.C. 154(b) by 126 days.

(21) Appl. No.: 10/277,798

(22) Filed: Oct. 22, 2002

(65) Prior Publication Data

US 2004/0075842 A1 Apr. 22, 2004

(51) Int. Cl.[7] .......................... G01B 9/02; G01N 21/00
(52) U.S. Cl. ................................. 356/511; 356/241.3
(58) Field of Search .......................... 356/489, 495, 356/511, 512, 241.1, 241.3

(56) References Cited

U.S. PATENT DOCUMENTS

| | | | |
|---|---|---|---|
| 5,777,738 A | 7/1998 | Kulawiec | |
| 6,188,480 B1 | 2/2001 | Drabarek | |
| 6,462,815 B1 * | 10/2002 | Drabarek et al. | 356/241.1 |

FOREIGN PATENT DOCUMENTS

| | | |
|---|---|---|
| DE | 195 36 143 A1 | 4/1997 |
| EP | 0 682 226 A2 | 4/1995 |
| WO | WO 01/27558 A1 | 10/2000 |

OTHER PUBLICATIONS

"The confocal interference microscope as a surface profilometer", D.K. Hamilton and H.J. Matthews, Optik, 71, No. 1 (1985) 31–34 , pp 31–34.

"A confocal inmterference microscope", D.K. Hamilton and C.J.R. Sheppard, Optica Acta, 1982, vol. 29 No. 12, pp 1573–1577.

"Rough surface intererometry with a two–wavelength heterodyne speckle interferometer", A.F. Fercher., H.Z. Hu, and U. Vry, Applied Optics, Jul. 15, 1985, vol. 24 No. 14, pp 2181–2188.

"Fast Optical Form Measurements of Rough Cylindrical and Conical Surfaces in Diesel Fuel Injection Components", T.J. Dunn, R. Michaels, S. Lee, M. Tronolone, and A. Kulawiec, Corning Tropel Corporation, Fairport, NY.

* cited by examiner

*Primary Examiner*—Samuel A. Turner
*Assistant Examiner*—Patrick J Connolly
(74) *Attorney, Agent, or Firm*—Thomas Ryan

(57) ABSTRACT

A scanning interferometer employs dual interferometer modules at different wavelengths to expand a dynamic range of measurement, a compound probe for measuring multiple surfaces, and a confocal optical system for distinguishing between the surfaces measured by the compound probe. Within the compound probe, miniature optics divide a test beam into two sub-test beams that are focused normal to different test surfaces. Both sub-test beams contain the different wavelengths. A separate interferometer monitors movements of the compound probe for producing absolute measures of the test surfaces.

56 Claims, 4 Drawing Sheets

TWO-WAVELENGTH CONFOCAL INTERFEROMETER FOR MEASURING MULTIPLE SURFACES

TECHNICAL FIELD

Interferometric measuring systems with optical probes as can be arranged for the practice of our invention provide for measuring localized surface features, geometric surface forms, and overall dimensions. The invention is particularly applicable to the measurement of cylindrical, conical, and flat surfaces whose roughness approaches tolerances for geometric form as well as to the measurement of test pieces having multiple surfaces requiring individual or comparative measurements.

BACKGROUND

Tolerances for many precision manufactured components continue to go beyond the capabilities of conventional contact measuring techniques. Optical measuring techniques, particularly those using interferometric mechanisms, provide for measuring with much greater precision. However, the roughness of the surfaces under test often exceeds one-half of the wavelengths used in conventional interferometers (i.e., wavelengths in the visible or near-infrared range). Surface features larger than one-half the measuring wavelength cannot be unambiguously measured with conventional interferometers. Longer wavelengths can be used, but lasers for producing such longer wavelengths are less common and more expensive than those available for producing wavelengths in the visible or near-infrared range.

Manufactured components that include multiple surfaces can require measurements of their individual surface forms (e.g., roundness and straightness) as well as measurements of relationships between their surfaces (e.g., runout and perpendicularity). Measuring each of the surfaces individually with setups or recalibrations between the different measurements is time consuming and can make comparisons difficult.

SUMMARY OF THE INVENTION

Our interferometer in one or more of its preferred embodiments provides for measuring multiple surfaces with a compound optical probe. Sub-test beams emitted from the probe separately measure the multiple surfaces. A confocal optical system distinguishes the measurements between the surfaces. Each of the sub-test beams can be composed of two fundamental wavelengths of light from different interferometers. Combined, the two interferometers greatly increase the dynamic range of measurement for measuring rough surfaces with conventional lasers.

An exemplary interferometer for measuring multiple surfaces of a test piece in accordance with our invention includes a test arm and a reference arm that convey test and reference beams along different but ultimately interconnected paths. A beamsplitter within the test arm separates the test beam into first and second sub-test beams. A focusing optic of the confocal optical system within the test arm focuses the first and second sub-test beams to different points of focus. A compound probe also within the test arm conveys the first and second sub-test beams to the different points of focus.

Preferably, each of the sub-test beams is intended for measuring a different surface of the test piece at normal incidence. As such, the principal axes of the sub-test beams are oriented normal to their incident test surfaces, which can be oriented in different directions. Directional optics within the probe direct the sub-test beams to their points of focus at their intended orientation. Additional sub-test beams can be split from the test beam within the test arm for measuring more than two surfaces of the test piece, each being directed to a point of focus at normal incidence to a different test surface.

The test surfaces are preferably measured individually in succession. An actuator relatively moves the probe with respect to the test piece between two or more measuring positions. In a preferred embodiment, the actuator is movable between two positions for measuring two surfaces of a test piece. At a first of the positions, the point of focus of the first sub-test beam is positioned on the first surface of the test piece and the point of focus of the second sub-test beam is positioned off both the first and second surfaces of the test piece. At a second of the positions, the point of focus of the second sub-test beam is positioned on the second surface of the test piece and the point of focus of the first sub-test beam is positioned off both the first and second surfaces of the test piece. Similarly, at a third or higher measuring position, the additional points of focus are positioned in turn on other of the test piece surfaces while the remaining points of focus are positioned off of all the test surfaces.

A detection system detects an interference signal between the reference beam and the first sub-test beam when the probe is located at the first position and detects an interference signal between the reference beam and the second or higher sub-test beam when the probe is located at the second or higher position. The detection system is preferably arranged in conjunction with a confocal optical system that excludes from detection light that is not focused on one of the test surfaces. An imaging optic of the confocal optical system can be used to refocus the sub-test beams conjugate to their points of focus of the focusing optic. A limited aperture size near the focus of the imaging optic limits a depth of focus through which light is effectively collected by a detector at the end of the confocal optical system. If any of the test surfaces are located out of focus (e.g., by as few as 10 to 100 microns), little of the reflected light reaches the detector. The aperture size can be limited by locating a stop near the conjugate focal point or by locating a detector of limited dimension near the same point of focus.

For measuring rough surfaces or surfaces with significant discontinuities, such as surfaces with an average roughness approaching one-half of wavelengths in the near-infrared range, our invention provides laser sources that produce two beams having different fundamental wavelengths of light. Beamsplitters divide each of the different wavelength beams into test and reference beams. Another beamsplitter combines the two different wavelength test beams into a common test beam composed of the two different wavelengths. It is the common test beam that is divided into the multiple sub-test beams, resulting in each of the sub-test beams being composed of the two wavelengths.

Each of the different wavelength reference beams preferably propagates along respective reference delay lines of the reference arm for controlling the optical path lengths traversed by the two reference beams. Preferably, the two reference delay lines have adjustable optical path lengths to equate optical path lengths between the test and reference arms of the interferometer. The optical path lengths of the test and reference arms can also be equated by incorporating similar path-length adjustments within the test arms.

The detection system preferably includes first and second arrays of detectors for separately detecting interference between each of the two pairs of test and reference beams. The detectors within each of the first and second arrays are preferably relatively phase shifted for simultaneously detecting a plurality of phase-shifted measurements within each of the first and second pairs of test and reference beams. The simultaneous phase-shifted measurements allow for discerning more accurate phase differences between the test and reference beams at each fundamental wavelength.

Although accurate, the two individual wavelength measurements produce ambiguous results for surface discontinuities greater than one-half the fundamental wavelengths. Our invention, however, provides a controller that combines information from the first and second arrays of detectors to produce aggregate interference measurements having a sensitivity equated to an effective wavelength significantly longer than either of the two different fundamental wavelengths. The aggregate measurements are useful for measuring surfaces with a roughness exceeding one-half the two fundamental wavelengths.

The actuator is preferably a part of a relative motion system between the probe and the test piece for measuring a plurality of points on each of the two surfaces of the test piece. Preferably, both the test arm and the reference arm are relatively movable together with the probe with respect to the test piece. The detection system is also preferably mounted together with the test and reference arms and the probe on a multi-axis stage assembly for relative motion with respect to the test piece. A base preferably supports both the test piece and the multi-axis stage assembly for relating motions between the probe and the test piece. A displacement-measuring interferometer preferably measures movements between the multi-axis stage assembly and the base. Information from the displacement-measuring interferometer can be combined with interferometric measurements taken through the probe to compensate for any motion errors of the relative motion system or to resolve remaining phase ambiguities required to obtain absolute measurements.

Our preferred method of measuring multiple surfaces of a test piece with a scanning interferometer follows the basic interferometric practice of dividing a beam of light into test and reference beams but further divides the test beam into multiple sub-test beams. The multiple sub-test beams are focused to different points for separately measuring different surfaces of the test piece. For measuring a first test piece surface, the point of focus of a first sub-test beam is positioned on the first surface of the test piece while the point of focus of a second or higher sub-test beam is positioned off of their respective measuring surfaces of the test piece. For measuring a second or higher test piece surface, the point of focus of the second or higher sub-test beam is positioned on the second or higher surface of the test piece while the point of focus of the first or other lower sub-test beams is positioned off of their respective measuring surfaces of the test piece. Relative motion between the probe and the test piece is used both (a) to move the points of focus across the test surfaces for measuring a plurality of points on each of the test surfaces and (b) to move the points of focus between the sequential measuring positions.

At their respective measuring positions, the sub-test beams are retroreflected from their points of focus on the surfaces of the test piece. The retroreflected sub-test beams are preferably refocused together with the reference beam proximate to a detector. Interference signals between each of the sub-test beams and the reference beam are detected separately according to which of the sub-test beams is positioned in focus on one of surfaces of the test piece.

The refocused light of the sub-test beams is refocused conjugate to their points of focus. A limiting aperture near the conjugate plane excludes light from the sub-test beam that is not focused on one of the surfaces of the test piece. A detector for detecting the refocused light is preferably positioned behind the limiting aperture and arranged to collect only the light that passes through the limiting aperture. Alternatively, a detector with a small active area can be located near the conjugate focal plane to function as a similarly limiting aperture excluding light that focuses before or after the focal plane. The retroreflected test beams could also be refocused through a limiting aperture prior to their recombination with the reference beam remote from the detector.

While confocal optical techniques can be used to distinguish one surface from another, two-wavelength interferometry is preferably used for extending the range of dynamic measurement to accommodate rough surfaces or surfaces with significant discontinuities. Two beams of coherent light having different fundamental wavelengths are each divided into test and reference beams. The different wavelength test beams are combined in advance of the step of dividing the test beam into multiple sub-test beams so that each of the multiple sub-test beams includes the two different fundamental wavelengths.

Along the path of retroreflection, the two fundamental wavelengths are re-separated for simultaneously measuring optical path differences between the test and reference beam portions of each of the fundamental wavelengths. The optical path differences expressed by the mechanism of interference provide overlapping measurements of individual points on one or the other of the test surfaces that is in focus. Relative motion (i.e., scanning) of the point of focus across the test surface allows for the accumulation of information describing the surface. Interference information detected from both fundamental wavelengths can be combined to reveal unambiguous measurements over a much wider range extending to one-half of an effective wavelength that is significantly longer than either of the two fundamental wavelengths.

In addition, the remaining ambiguities of the combined interferometric measurements in two wavelengths can be resolved by measuring from a known point of reference the movements required for positioning the points of focus of the sub-test beams on the surfaces of the test piece. For example, the displacement-measuring interferometer can be calibrated to a master test piece and used to track the further motions required to move the probe into the measuring positions. With the positions of the probe known and the positions of the test surfaces known with respect to the probe, absolute measures of the test surfaces can be made.

DRAWINGS

DETAILED DESCRIPTION

Figure 1:
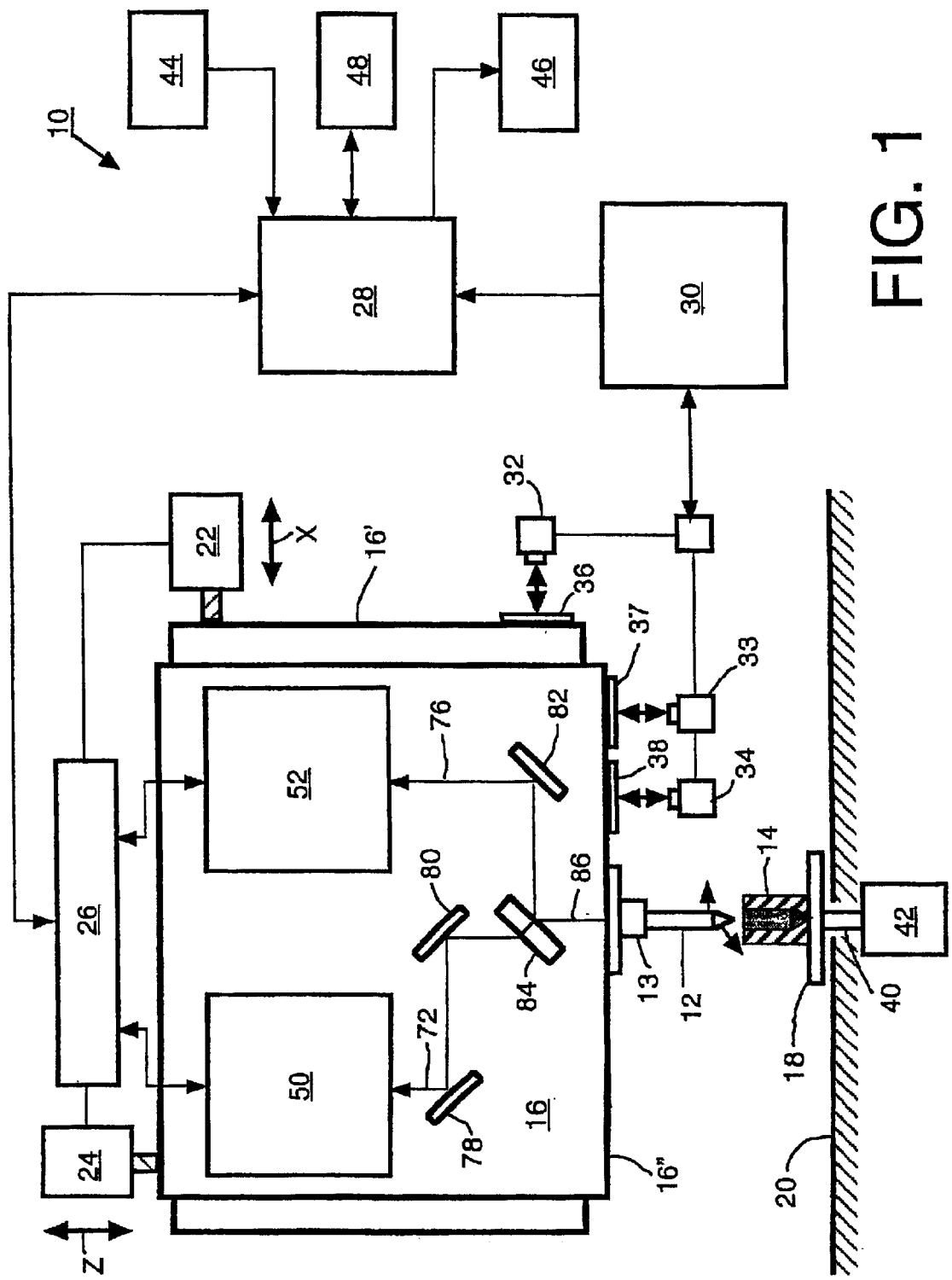
FIG. 1 is a diagram of an exemplary scanning interferometer system in accordance with our invention.

An exemplary scanning interferometer system 10 shown in FIG. 1 includes a compound probe 12 for measuring a test piece 14 having multiple internal surfaces. The compound probe 12 is mounted on a multi-axis stage assembly 16, and the test piece 14 is mounted on a rotary chuck 18. A base 20 supports both the multi-axis stage assembly 16 and the rotary chuck 18 for relating relative motions between the compound probe 12 and the test piece 14.

The multi-axis stage assembly 16 is preferably translatable in two orthogonal directions X and Z via mechanical crossed roller bearing stages 16' and 16" driven by respective motor actuators 22 and 24. Both of the motor actuators 22 and 24 are preferably brushless, slotless DC motors with integral encoders. The compound probe 12 is moved by the multi-axis stage assembly 16 along a desired motion profile by conventional control electronics 26 for the motor actuators 22 and 24 under the programmable direction of a microcomputer 28.

Since the stage motion is neither perfectly smooth nor straight, a three-axis displacement-measuring interferometer 30 is used to monitor the motion. Three measurement arms 32, 33, and 34 of the displacement-measuring interferometer 30 are shown for monitoring translational motions in the two orthogonal directions of stage motion X and Z and a rotational motion about an axis extending in a third orthogonal direction. The two translational motions are measured by the measurement arms 32 and 33 or 34. The rotational motion is measured by differential measures between the measurement arms 33 and 34. The measurement arms 32, 33, and 34 are preferably connected to the stage assembly 16 by mirrors 36, 37, and 38 constructed from a low-expansion glass. The light source for the displacement-measuring interferometer 30 is preferably a frequency-stabilized helium-neon laser (not shown). The displacement-measuring interferometer 30 measures errors in straightness and yaw in addition to displacement errors of the stage motions. This error data is recorded to remove stage motion errors from probe profile measurements.

The probe 12 is preferably mounted in a kinematic bracket 13 with a magnetic preload that allows the probe 12 to be removed and reinserted or replaced while maintaining the original alignment. The rotary chuck 18 mounting the test piece 14 is preferably a hydraulic expansion chuck rotatable on an air bearing spindle 40 powered by a direct-drive brushless DC motor 42 with an integral high-resolution encoder. Quadrature signals from the spindle encoder are used to clock data acquisition including data from the displacement-measuring interferometer during measurement. Residual tilt and decenter mounting errors can be removed by software analysis of probe measurements.

The base 20 supporting both the multi-axis stage assembly 16 for the probe 12 and the rotary chuck 18 for the test piece 14 is preferably made of granite and includes a riser (not shown) on which the multi-axis stage assembly 16 is supported. The rotary chuck 18 is mounted in a hole through the base 20. The granite structure of the base 20 is integrated into a cradle (not shown) supported by a pneumatic isolation frame (also not shown) for increased immunity from external vibration sources.

Two interferometer modules 50 and 52 are carried by the multi-axis stage assembly 16. The two interferometer modules 50 and 52 are preferably identical except as required to accommodate different fundamental wavelengths of largely coherent light. Both fundamental wavelengths are preferably within the near-infrared range. For example, the interferometer module 50 can be operated at a wavelength $\lambda_1$ of 1550 nanometers (nm), and the interferometer module 52 can be operated at a wavelength $\lambda_2$ of 1310 nanometers (nm). Both interferometer modules 50 and 52 are independently capable of measuring smooth parts; but when analyzed together, a combined interference pattern is generated at a much longer effective wavelength $\lambda_e$ capable of measuring rougher surfaces with greater dynamic ranges. The effective wavelength $\lambda_e$ is given as follows:

$$\lambda_e = \frac{\lambda_1 * \lambda_2}{|\lambda_1 - \lambda_2|}$$

Substituting the fundamental wavelengths of 1310 nm and 1550 nm yields an effective wavelength $\lambda_e$ of 8460 nm or approximately 8.5 microns ($\mu$m). Surfaces with a roughness Rz (comparing five highest peaks to five lowest troughs) in the order of 2 microns ($\mu$m) can easily be measured at the effective wavelength $\lambda_e$ of approximately 8.5 microns ($\mu$m).

Figure 2:
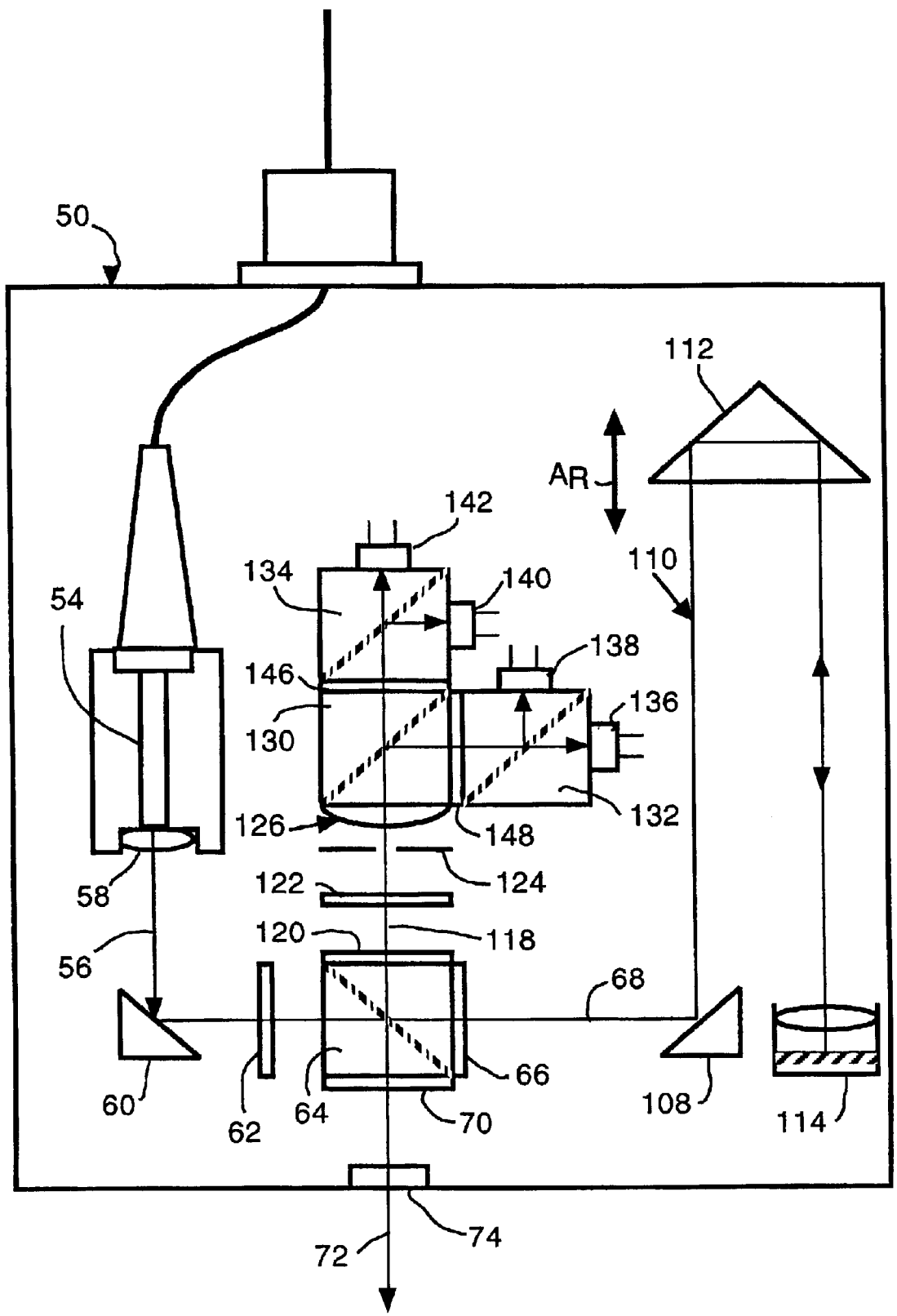
FIG. 2 is another diagram showing the layout of one of two different wavelength interferometers that are combined within the scanning interferometer system to increase the range of measurement.

Although only the interferometer module 50 is illustrated (see FIG. 2), the depicted features are common to both interferometer modules 50 and 52 varying only to accommodate the different fundamental wavelengths $\lambda_1$ and $\lambda_2$. For example, both interferometer modules 50 and 52 preferably include a distributed feedback (DFB) solid-state laser 54 as a source of coherent linearly polarized light. The emitted light beam 56 is collimated by lens assembly 58 and reflected by folding mirror 60 on a path through a half-wave retardation plate 62 to a first polarizing beamsplitter cube 64. Linearly polarized at 45 degrees, part of the light beam 56 passes directly through both the beamsplitter cube 64 and an attached quarter-wave retardation plate 66 as a first reference beam 68. The remaining part of the light beam 56 is reflected by the beamsplitter cube 64 through another quarter-wave retardation plate 70 as a first test beam 72, which passes through a shuttered aperture 74 of the interference module 50.

A second test beam 76 differing only in fundamental wavelength emerges from the interferometer module 52. Three folding mirrors 78, 80, and 82 orient the two test beams 72 and 76 relative to a dichroic beamsplitter 84 that merges the two test beams 72 and 76 into a combined test beam 86 en route to the compound probe 12.

Figure 3:
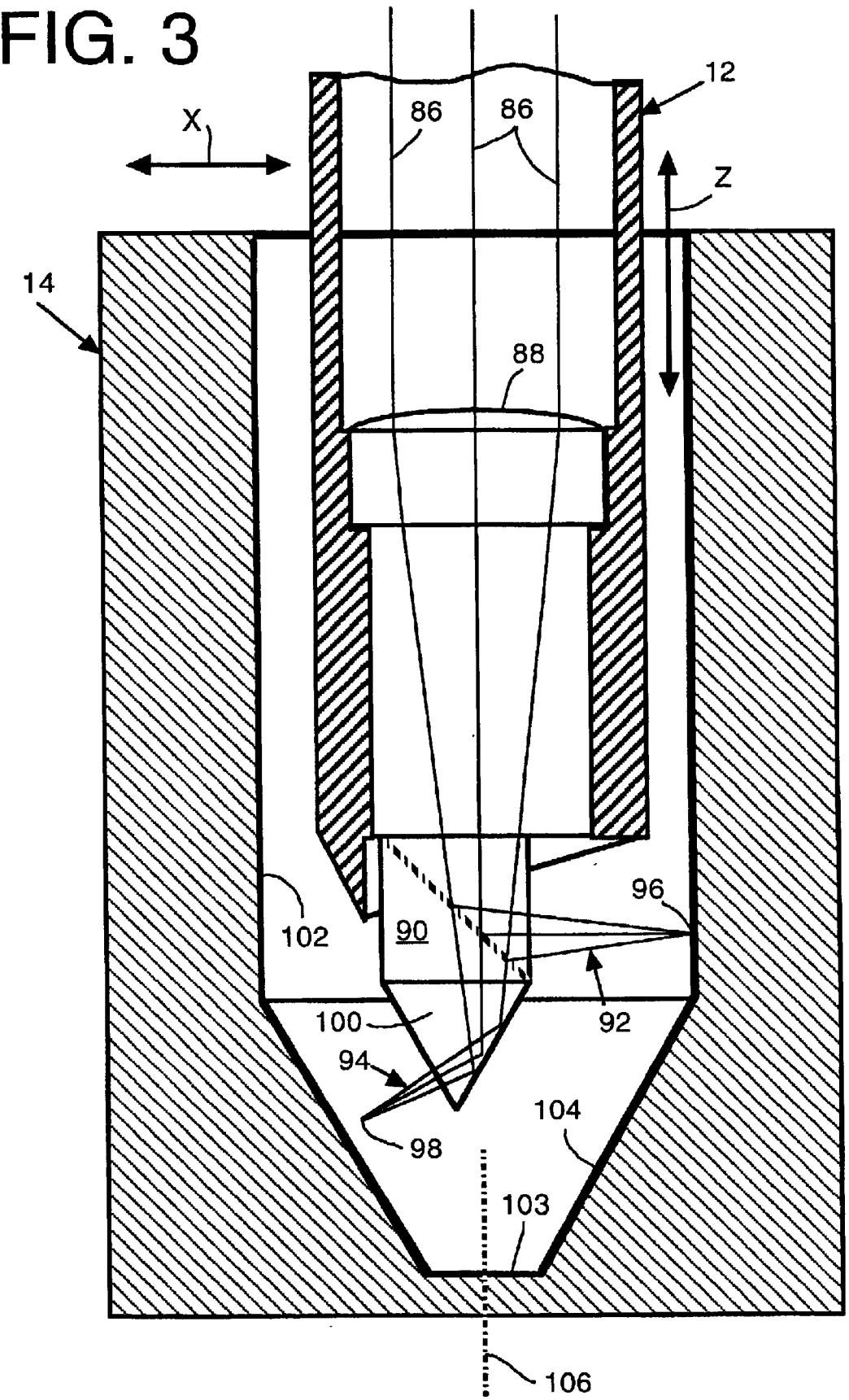
FIG. 3 is a greatly enlarged cross-sectional view of a probe in a first position for conveying a first of two focused sub-test beams to one of two internal surfaces of a test piece at normal incidence.
Figure 4:
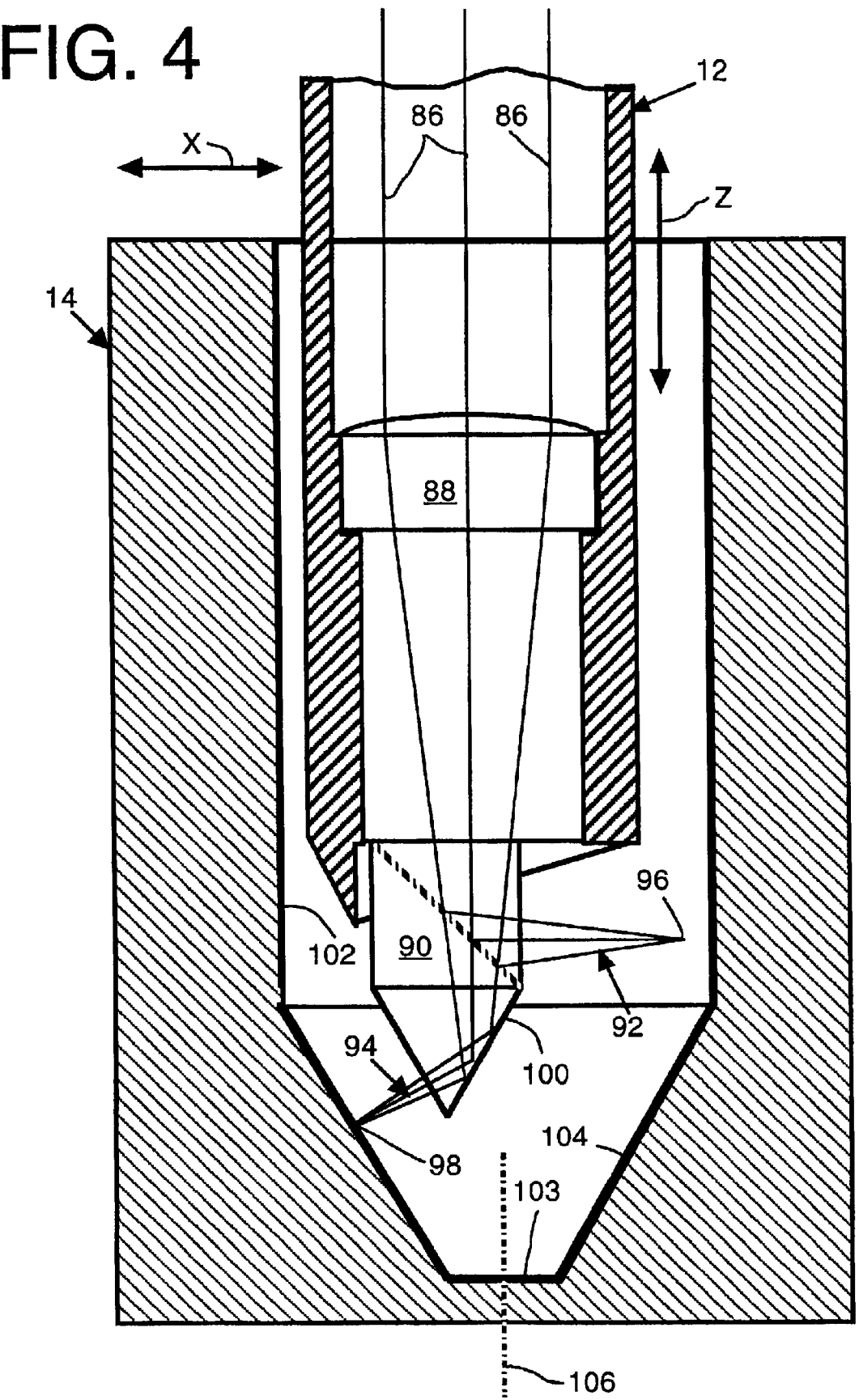
FIG. 4 is a greatly enlarged cross-sectional view of the same probe in a second position for conveying a second of two focused sub-test beams to the other of two internal surfaces of a test piece at normal incidence.

Within the compound probe 12 as shown in FIGS. 3 and 4, the combined beam is reshaped by a focusing optic 88 of a confocal optical system before being split by another beamsplitter cube 90 into two sub-test beams 92 and 94. Each of the sub-test beams 92 and 94 contains both fundamental wavelengths $\lambda_1$ and $\lambda_2$. The focusing optic 88 mounted within the compound probe 12 focuses the two sub-test beams 92 and 94 to different points of focus 96 and 98. (It is this characteristic that makes the probe 12 a compound probe.) Before reaching its point of focus 98, the sub-test beam 94 is folded by a prism 100 (a directional optic) that angularly orients the sub-test beam 94 with respect to the sub-test beam 92. The two sub-test beams 92 and 94 are oriented normal to two internal surfaces of revolution 102 and 104 within the test piece 14. In the illustrations of FIGS. 3 and 4, the test surface 102 has the form of a cylinder, and the test surface 104 has the form of a truncated cone.

The two test surfaces 102 and 104 are measured one at a time. A relative motion system, which includes the drive motor actuators 22 and 24 under programmable control, moves the compound probe 12 in the orthogonal directions X and Z to separately trace the expected profiles of the test surfaces 102 and 104. The drive motor 42 rotates the test piece 14 about a common axis 106 of the internal (test) surfaces of revolution 102 and 104 to provide three-dimensional scans of the surfaces. Although shown angularly related through a particular obtuse angle, the two test surfaces can be relatively oriented through a range of different angles including a right angle where one of the test surfaces is a cylinder and the other is a flat.

For separately measuring the two test surfaces 102 and 104, the compound probe 12 is movable between:

a first position at which the point of focus 96 of the sub-test beam 92 is positioned on the test surface 102 and the point of focus 98 of the sub-test beam 94 is positioned off both test surfaces 102 and 104 (see FIG. 3) and a second position at which the point of focus 98 of the sub-test beam 94 is positioned on the test surface 104 and the point of focus 96 of the sub-test beam 92 is positioned off both the test surfaces 102 and 104 (see FIG. 4).

Within each of the two positions, the compound probe 12 is relatively translated while the test piece 14 is relatively rotated to scan a range of points on one or the other of the test surfaces 102 and 104.

During the course of measurement, light retroreflected from the test surfaces 102 or 104 re-enters the compound probe 12 on return paths to the two interferometer modules 50 and 52. The entire routes of the two test beams 72 and 76, the combined test beam 86, and two sub-test beams 92 and 94 are contained within a test arm of our scanning interferometer 10 between the corresponding beamsplitter cubes 64 (only one shown) in the interferometer modules 50 and 52 and the two points of focus 96 and 98. Exemplary of both test beams 72 and 76, the test beam 72 re-encounters the one-quarter wave retardation plate 70 in advance of the beamsplitter cube 64. The two encounters with the one-quarter wave retardation plate 70 have the effect of rotating polarization so that the returning test beam 72 is transmitted rather than reflected by the beamsplitter cube 64.

Each of the interferometer modules 50 and 52 contains a working reference arm. The reference beam 68 emerging from the beamsplitter cube 64 is reflected by a folding mirror 108 along a reference delay line 110, which also includes a compound reflecting prism 112 and a reference module 114 that provides for retroreflecting the reference beam on a return path to the beamsplitter cube 64. The compound reflecting prism 112 is adjustable along an optical axis in opposite directions $A_R$ for matching the optical path length of the reference arm to the optical path length of the test arm. The reference module 114 simulates optics of the compound probe 12 to match the optical experiences of a range of rays surrounding the optical axis between the test and reference arms.

The optical path lengths of the test and references arms can also be nominally equated by making path length adjustments to the test arm. For example, the interferometer modules 50 and 52 can be adjusted in position on the multi-axis stage assembly 16 with respect to the folding mirrors 78 and 82 to change the physical path lengths traversed by the first and second test beams 72 and 76.

The returning reference beam 68 re-encounters the one-quarter wave retardation plate 66 and is reflected rather than transmitted through the beamsplitter cube 64 into alignment with the test beam 72. A combined test and reference beam 118 emerges from the beamsplitter cube 64 through another one-half wave retardation plate 120 as 45 degree linearly polarized light. An interference filter 122, which removes unwanted wavelengths, and an aperture stop 124, which removes stray rays, reduce noise in the combined test and reference beam 118.

An imaging optic 126 of the confocal optical system in combination with a cluster of three beamsplitter cubes 130, 132, and 134 images the combined test and reference beam 118 onto four detectors 136, 138, 140, and 142 having an incremental 90 degree phase shift among them. Respective points of focus of the imaging optic 126 are preferably conjugate to the focal points 96 and 98 of the sub-test beams 92 and 94 and are preferably coincident with the four detectors 136, 138, 140, and 142. Each of the four detectors 136, 138, 140, and 142 receives light through a limited aperture size at the focus of the imaging optic 126. Together, the focusing and imaging optics 88 and 126 function as opposite ends of a confocal optical system that excludes light that does not approach the conjugate points of focus.

Either the detectors 136, 138, 140, and 142 can be arranged in conjunction with aperture stops of limited size or the detectors 136, 138, 140, and 142 themselves can be of limited size (e.g., 10 to 100 microns) to exclude light at different depths of focus (e.g., 10 to 100 microns depths of focus). Since the focus 96 or 98 of just one of the sub-test beams 92 or 94 is located on one of the test surfaces 102 or 104 of the test piece 14 in each of the two measuring positions, the imaging optic 126 allows for the detection of light from just one of the two sub-test beams 92 or 94 at each of the two measuring positions. Thus, each of the two test surfaces 102 and 104 of the test piece 14 can be separately measured with the compound probe 12.

Alternatively, the imaging optic 126 could be located in advance of the beamsplitter cube 64 for refocusing one or the other of the test beams 72 or 76 independently of the reference beam. A limiting aperture, such as a stop, is preferably located near the conjugate focus of the imaging optic 126 for excluding the further propagation of light that is not retroreflected from one of the points of focus 96 or 98 on one of the test surfaces 102 or 104.

The clustered beamsplitter cubes 130, 132, and 134 are separated by retardation plates 146 and 148 to support 90 degree phase shifts among the four detectors 136, 138, 140, and 142. The data acquisition system timed to the incremental rotation of the test piece 14 simultaneously acquires data from all four detectors 136, 138, 140, and 142 in each of the two interferometer modules 50 and 52 along with data from the three-axis displacement-measuring interferometer 30 for generating instantaneous measurements at individual points on one or the other of the test surfaces 102 or 104. The phase-shifted data allows for the more precise identification of phase differences between the combined test and reference beams, and the displacement data relates data points with improved accuracy along the measured profiles of the test surfaces 102 and 104. Phase data from the two interferometer modules 50 and 52 can be combined to produce measurements having a greater dynamic range for accommodating test surfaces having roughness or other surface discontinuities that would otherwise yield ambiguous results.

Both interferometer modules 50 and 52 simultaneously measure the same points on either of the test surfaces 102 and 104. Accordingly, phase information is directly combinable for producing measures at an effective wavelength $\lambda_e$ that is longer than the wavelengths $\lambda_1$ and $\lambda_2$ of the two interferometer modules 50 and 52. The longer effective wavelength $\lambda_e$ allows phase information from the two interferometer modules 50 and 52 to be unambiguously resolved over a greater range of surface variation.

Although the illustrated probe 12 splits the combined test beam 86 into two sub-test beams 92 and 94, the probe could be arranged to include other directional optics for splitting the combined test beam into three or more sub-test beams for similarly measuring three or more surfaces of a test piece, such as the cylindrical surface 102, the truncated conical surface 104, and a plane surface 103 of the test piece 14. Instead of mounting the two interferometer modules 50 and 52 on the multi-axis stage assembly 16, the interferometer modules 50 and 52 could be mounted independently of the stage assembly 16 and connected to the compound probe 12 by a flexible optical connection, such as a single mode optical fiber.

Our new method is preferably practiced by producing two beams (e.g., beams 56) of substantially coherent light having different fundamental wavelengths. The two fundamental wavelengths are preferably in the near-infrared range, where suitable laser sources are readily available for the field of telecommunications. Shorter wavelengths are subject to more speckle, and longer wavelengths generally require more expensive laser sources.

Both of the different wavelength beams 56 are divided into test beams 72 and 76 and reference beams 68. The two test beams 72 and 76 are combined and later divided into first and second sub-test beams 92 and 94, each including both fundamental wavelengths. A common focusing optic 88 focuses the first and second sub-test beams 92 and 94 to different points of focus 96 and 98 for separately measuring two different surfaces 102 and 104 of the test piece 14.

As shown in FIG. 3, the point of focus 96 of the first sub-test beam 92 is positioned on the surface 102 of the test piece 14 while the point of focus 98 of the second sub-test beam 94 is positioned off of both test surfaces 102 and 104. Precise positioning of the focus 96 on the test surface 102 can be achieved by monitoring modulation (contrast) or intensity as a function of position within either of the two interferometer modules 50 or 52 and choosing the position of greatest modulation or highest intensity. The focusing and imaging optics 88 and 126 cause both modulation and intensity to rapidly decrease for either point of focus 96 or 98 that departs from one of the test surfaces 102 or 104.

The point of focus 96 of the first sub-test beam 92 is moved across the test surface 102, while a data acquisition system, which includes the detectors 136, 138, 140, and 142, acquires point-by-point height information about the test surface 102. Preferably, the data acquisition is timed with the rotation of the test piece 14 while the point of focus 96 is translated along a desired rotational profile of the test surface 102. Typical speeds for measuring a 3.5 millimeter (mm) diameter internal surface are 600 revolutions per minute of rotation with 4 to 50 microns of translation per revolution. Data points are typically collected in an array of approximately 200–1000×1024, where the rows correspond to the increments of translation and the columns correspond to increments of rotation. Of course, more or less points can be acquired at these or other speeds.

As shown in FIG. 4, the other test surface 104 is measured by positioning the point of focus 98 of the second sub-test beam 94 on the test surface 104 while the point of focus 96 of the first sub-test beam 92 is positioned off of both test surfaces 102 and 104. Similar monitoring techniques can be used to locate the point of focus 98 on the test surface 104, and a similar combination of relative motions (e.g., rotation and translation) can be used to scan the point of focus 98 across the test surface 104 for acquiring a corresponding array of data.

At each of the two measuring positions, light retroreflected from one of the test surfaces 102 or 104 is refocused together with the reference beams 68 onto the detectors 136, 138, 140, and 142. Interference signals (i.e., phase differences) between the reference beams 68 and the first and second sub-test beams 92 and 94 are separately detected according to which of the sub-test beams 92 or 94 is positioned in focus on one of the test surfaces 102 or 104. Optical path lengths of the reference beams 68 are preferably adjustable to provide nominally equal optical path lengths between the test and reference arms to eliminate phase variations caused by changes in temperature or laser wavelength fluctuations. The optical path lengths of the test and reference arms can also be nominally equated by making similar adjustments to the test arm.

The refocusing preferably includes limiting an aperture dimension of the refocused light to exclude from detection light from the sub-test beam 92 or 94 that is not focused onto one of the test surfaces 102 or 104. The detectors 136, 138, 140, and 142, which can themselves be limited in aperture dimension, are preferably located at points of focus conjugate to the points of focus 96 and 98 of the two sub-test beams 92 and 94.

The detectors 136, 138, 140, and 142 are preferably arranged in two groups, each for measuring interference characteristics of one of the two fundamental wavelengths. The detectors within each group are separated in phase for simultaneously detecting phase-shifted interference signals between both of the pairs of test and reference beams having different fundamental wavelengths. Preferably, four detectors 136, 138, 140, and 142 are phase shifted within each group through increments of 90 degrees. As few as three or more than four can be used to provide lesser or greater accuracy for discriminating phase information.

The phase information from each of the two groups of detectors 136, 138, 140, and 142 provides precise information about variations in the test surfaces 102 or 104 over limited ranges corresponding to one-half the fundamental wavelengths $\lambda_1$ and $\lambda_2$. However, the simultaneous phase information from the two groups of detectors 136, 138, 140, and 142 can be combined to provide additional phase information that resolves phase ambiguities up to one-half of a longer effective wavelength $\lambda_e$.

In addition to acquiring information about phase variations from one or the other of the two sub-test beams 92 or 94, information is also acquired about the relative motions between the points of focus 96 and 98 and the test piece 14. The additional information, which is collected simultaneously with the information from the sub-test beams 92 or 94, includes deviations from a desired path of relative motion. The deviations of relative motion combined with the phase variations of the sub-test beams 92 or 94 provide accurate measures of test surface variations from the desired path of relative motion.

Conventional data analysis can be applied to these measures by the microprocessor 28 to extract measures of both form and geometry, including roughness, runout, concentricity, and tilt. Errors relating to the mounting and rotating of the test piece 14, such as decenter and tilt, can be removed by conventional analysis techniques. Relational measurements can also be made between the two surfaces 102 and 104, such as runout, co-axiality, and perpendicularity. A workstation 44, an output 46 such as a printer or CRT, and a storage device 48 such as a hard disk or optical disk are connected to the microprocessor 28 to provide a conventional interface.

In addition to removing stage motion errors from probe profile measurements, the displacement-measuring interferometer 30 can also be used to resolve modulo $2\pi$ phase ambiguities at the effective wavelength $\lambda_e$ of the combined measurements of the two interferometer modules 50 and 52 to produce absolute measurements of the test piece 14. The displacement-measuring interferometer 30 can be calibrated to a master test piece of known dimensions, and the further relative motion required to move a point of focus 96 or 98 from a surface of the master having a known dimension (e.g., diameter) to a position on one of the test surfaces 102 or 104 can be measured. Combining the known dimension of the master with the further relative motion of the probe 12 to a measuring position provides an absolute measure of the test piece 14 within sufficient accuracy to resolve the modulo $2\pi$ phase ambiguities at the effective wavelength $\lambda_e$ of the combined measurements of the two interferometer modules 50 and 52.

As explained earlier, the probe 14 is moved to precise measuring positions by exploiting the confocal nature of the interferometric measurements made through the probe 14. Both the modulation (contrast) of the interference signal and the intensity of light returning from the probe 14 to the detectors 136, 138, 140, and 142 rapidly decrease as either point of focus 96 or 98 departs from one of the test surfaces 102 or 104. The multi-axis stage assembly 16 can be adjusted to position the probe 14 to the measuring positions at which the highest modulation or intensity is detected, and the displacement-measuring interferometer 30 tracks the absolute location of these measuring positions from which the more precise interferometric measurements are made.

Precise absolute measurements of the test surfaces 102 and 104 can be made in stages. The information acquired from the calibrated displacement-measuring interferometer 30 resolves the modulo $2\pi$ phase ambiguities at the effective wavelength $\lambda_e$ of the combined measurements of the two interferometer modules 50 and 52, and the information acquired from the combined measurements of the two interferometer modules 50 and 52 at the effective wavelength $\lambda_e$ resolves the modulo $2\pi$ phase ambiguities at either or both of the fundamental wavelengths $\lambda_1$ or $\lambda_2$ of the two interferometer modules 50 or 52. Within the dimensions of the fundamental wavelengths $\lambda_1$ or $\lambda_2$, conventional phase-shifting techniques, such as those based on the simultaneous detection of phase-shifted measurements by the multiple detectors 136, 138, 140, and 142, can be used to accurately identify the phase of the interference signals for even further extending the precision of the absolute measurements.

Although the two interference modules 50 and 52 are shown mounted on the multi-axis stage assembly 16, the two modules 50 and 52 could also be mounted independent of the multi-axis stage assembly 16 and be connected to the probe 12 through a more flexible optical connection. For example, the two modules 50 and 52 could be connected to the probe 12 through fiber optics.

Two separate enclosures (neither shown) are used for environmental regulation. The control electronics are housed within one of the enclosures, and the optical and electromechanical components from the probe 12 to the rotary chuck 18 are housed in the other enclosure. The environmental control system (not shown) can include a solid-state thermoelectric cooler and heater, a blower assembly, and control and monitoring electronics positioned throughout the enclosures. Temperatures within 0.25 degrees Celsius are preferably maintained within the optical and electromechanical component enclosure.

We claim:

1. A scanning interferometer for measuring first and second surfaces of a test piece in sequence comprising:
    a test arm and a reference arm that convey test and reference beams of light;
    a beamsplitter within the test arm that separates the test beam into first and second sub-test beams;
    a focusing optic within the test arm that focuses the first and second sub-test beams to different points of focus;
    a compound probe within the test arm that conveys the first and second sub-test beams to the different points of focus;
    an actuator that relatively moves the probe with respect to the test piece between
    a first position at which:
        (a) the point of focus of the first sub-test beam is positioned on the first surface of the test piece and
        (b) the point of focus of the second sub-test beam is positioned off both the first and second surfaces of the test piece, and
    a second position at which:
        (a) the point of focus of the second sub-test beam is positioned on the second surface of the test piece and
        (b) the point of focus of the first sub-test beam is positioned off both the first and second surfaces of the test piece; and
    a detection system that detects interference signals between the reference beam and the first sub-test beam when the probe is located at the first position and detects interference signals between the reference beam and the second sub-test beam when the probe is located at the second position.

2. The interferometer of claim 1 in which the focusing optic is a part of a confocal optical system that excludes from detection light that is not focused on one of the test surfaces.

3. The interferometer of claim 2 in which the confocal optical system includes an imaging optic that focuses the first and second sub-test beams conjugate to the points of focus of the focusing optic.

4. The interferometer of claim 3 in which the detection system includes a detector that receives light through a limiting aperture at the focus of the imaging optic.

5. The interferometer of claim 1 in which the compound probe includes directional optics that direct the first and second sub-test beams at nominally normal incidence to the first and second surfaces of the test piece.

6. The interferometer of claim 5 in which the directional optics of the compound probe orient the first and second sub-test beams in different directions.

7. The interferometer of claim 1 further comprising laser sources that produce two beams having different first and second fundamental wavelengths.

8. The interferometer of claim 7 in which the beamsplitter is a first of a plurality of beamsplitters, a second of the beamsplitters divides the first wavelength beam of light into a first pair of test and reference beams, and a third of the beamsplitters divides the second wavelength beam into a second pair of test and reference beams.

9. The interferometer of claim 8 further comprising a fourth of the beamsplitters that combines the different wavelength test beams from the first and second pairs of test and reference beams into a common test beam such that each of the first and second sub-test beams contains both of the fundamental wavelengths.

10. The interferometer of claim 9 further comprising first and second reference delay lines within one of the test and reference arms for nominally equating optical path lengths traversed by the first and second pairs of test and reference beams.

11. The interferometer of claim 10 in which the first and second reference delay lines have adjustable optical path lengths to equate optical path lengths between the test and reference arms.

12. The interferometer of claim 9 in which the detection system includes first and second arrays of detectors that separately detect interference between each of the first and second pairs of test and reference beams.

13. The interferometer of claim 12 in which the detectors of the first and second arrays are relatively phase shifted for simultaneously detecting a plurality of phase-shifted measurements within each of the first and second pairs of test and reference beams.

14. The interferometer of claim 13 further comprising a controller that combines information from the first and second arrays to produce aggregate interference measurements having a sensitivity equated to an effective wavelength significantly longer than either of the first and second wavelengths.

15. The interferometer of claim 1 in which the actuator is a part of a relative motion system between the probe and the test piece for measuring a plurality of points on each of the first and second surfaces of the test piece.

16. The interferometer of claim 15 in which both the test arm and the reference arm are relatively movable together with the probe with respect to the test piece.

17. The interferometer of claim 16 in which the test arm, the reference arm, and the detection system are mounted together with the probe on a multi-axis stage assembly for relative motion with respect to the test piece.

18. The interferometer of claim 17 further comprising a base that supports both the test piece and the multi-axis stage assembly for relating motions between the probe and the test piece.

19. The interferometer of claim 18 further comprising a displacement-measuring interferometer that measures movements between the multi-axis stage assembly and the base.

20. The interferometer of claim 1 in which the beamsplitter and the focusing optic are supported within the probe.

21. The interferometer of claim 1 in which the beamsplitter further separates the test beam into a third sub-test beam and the focusing system focuses the third sub-test beam to another different point of focus.

22. The interferometer of claim 21 in which the actuator relatively moves the probe with respect to the test piece between a third position at which:
 (a) the point of focus of the third sub-test beam is positioned on a third test surface of the test piece and
 (b) the points of focus of the first and second sub-test beams are positioned off the first, second, and third test surfaces of the test piece.

23. The interferometer of claim 22 in which the detection system detects interference signals between the reference beam and the third sub-test beam when the probe is located at the third position.

24. A method of measuring multiple surfaces of a test piece with a scanning interferometer comprising the steps of:
 dividing a beam of light into test and reference beams;
 further dividing the test beam into first and second sub-test beams;
 focusing the first and second sub-test beams to different points of focus for separately measuring first and second surfaces of the test piece;
 positioning the point of focus of the first sub-test beam on the first surface of the test piece while positioning the point of focus of the second sub-test beam off of both the first and second surfaces of the test piece;
 relatively moving the point of focus of the first sub-test beam across the first surface of the test piece;
 positioning the point of focus of the second sub-test beam on the second surface of the test piece while positioning the point of focus of the first sub-test beam off of both the first and second surfaces of the test piece;
 relatively moving the point of focus of the second sub-test beam across the second surface of the test piece;
 retroreflecting the first and second sub-test beams from their respective points of focus on the surfaces of the test piece;
 directing the retroreflected first and second sub-test beams together with the reference beam proximate to a detector; and
 separately detecting interference signals between the reference beam and the first and second sub-test beams according to which of the sub-test beams is positioned in focus on one of the first and second surfaces of the test piece.

25. The method of claim 24 in which the step of directing includes refocusing the retroreflected first and second sub-test beams en route to the detector.

26. The method of claim 25 in which the step of directing includes refocusing the retroreflected first and second sub-test beams together with the reference beam proximate to a detector.

27. The method of claim 25 in which the step of separately detecting includes limiting an aperture dimension of the refocused light for excluding light from the sub-test beam that is not focused on one of the first and second surfaces of the test piece.

28. The method of claim 27 in which the step of refocusing includes refocusing the first and second sub-test beams conjugate to their points of focus.

29. The method of claim 28 in which the step of separately detecting includes the further steps of locating a detector at the conjugate point of focus and arranging the detector to collect light from a limited area of a conjugate focal plane to exclude light that refocuses before or after the conjugate focal plane.

30. The method of claim 24 in which the step of separately detecting includes simultaneously detecting phase-shifted interference signals between the reference beam and either of the first and second sub-test beams that is focused on one of the test surfaces.

31. The method of claim 24 including a further step of adjusting an optical path length of one of the test and reference beams to nominally equate optical path lengths of the test and reference beams.

32. The method of claim 24 including a further step of producing two beams of coherent light having different fundamental wavelengths and the step of dividing includes dividing each of the different wavelength beams into test and reference beams.

33. The method of claim 32 including a further step of combining the different wavelength test beams in advance of the step of dividing the test beam into first and second sub-test beams so that each of the first and second sub-test beams includes the two different fundamental wavelengths.

34. The method of claim 33 in which the step of separately detecting includes separately but simultaneously detecting the interference signals between the test and reference beam portions of each of the fundamental wavelengths.

35. The method of claim 34 including a further step of combining the interference signals detected for both fundamental wavelengths to produce an interference signal having a sensitivity to surface variations equivalent to those of a wavelength longer than either of the two different fundamental wavelengths of coherent light.

36. The method of claim 24 in which the step of further dividing includes dividing the test beam into a third sub-test beam.

37. The method of claim 36 in which the step of focusing includes focusing the third sub-test beam to a different point of focus for separately measuring a third surface of the test piece.

38. The method of claim 37 in which the step of positioning includes positioning the focus of the third sub-test beam on the third surface of the test piece while positioning the points of focus of the first and second sub-test beams off of the first, second, and third surfaces of the test piece, and including an additional step of relatively moving the third sub-test beam across the third surface of the test piece.

39. The method of claim 38 in which the step of retroreflecting includes retroreflecting the third sub-test beam from its point of focus on the surface of the test piece, and the step of directing includes directing the retroreflected third sub-test beam together with the reference beam proximate to a detector.

40. The method of claim 39 in which the step of separately detecting includes separately detecting interference signals between the reference beam and the first, second, and third sub-test beams according to which of the sub-test beams is positioned in focus on one of the first, second, or third surfaces of the test piece.

41. The method of claim 24 including a further step of measuring the relative motion of the point of focus of the first sub-test beam across the first surface of the test piece with a separate interferometer to detect and compensate for errors in the relative motion.

42. The method of claim 41 including a further step of measuring the relative motion of the point of focus of the second sub-test beam across the second surface of the test piece with the separate interferometer to detect and compensate for errors in the relative motion.

43. The method of claim 24 including a step of measuring from a known point of reference the movements required for positioning the point of focus of the first sub-test beam on the first surface of the test piece with a separate interferometer for resolving modulo $2\pi$ phase ambiguities of the interference signal between the reference beam and the first sub-test beam.

44. The method of claim 43 including a step of measuring from a known point of reference the movements required for positioning the point of focus of the second sub-test beam on the second surface of the test piece with the separate interferometer for resolving modulo $2\pi$ phase ambiguities of the interference signal between the reference beam and the second sub-test beam.

45. A method of making absolute measurements with a confocal scanning interferometer comprising the steps of:
dividing a beam of light into test and reference beams;
focusing the test beam to a point of focus;
adjusting the point of focus with respect to a surface of a test piece;
retroreflecting the test beam from the surface of the test piece;
refocusing the retroreflected test beam through a limiting aperture near a conjugate point of focus;
combining the retroreflected test beam with the reference beam for producing an interference signal;
monitoring variations of the test beam component of the interference signal;
determining a position at which the point of focus lies on the surface of the test piece based on the monitored variations of the interference signal;
separately measuring relative movements of the point of focus with respect to a known point of reference to the position at which the point of focus lies on the surface of the test piece; and
resolving phase ambiguities of the interference signal based on the measured relative movements of the point of focus with respect to the known point of reference for making absolute measurements of the test surface.

46. The method of claim 45 in which the step of separately measuring includes arranging a separate interferometer for measuring the relative movements of the point of focus.

47. The method of claim 46 including a further step of calibrating the separate interferometer by moving the point of focus to a position that lies on a surface of a master having a known dimension.

48. The method of claim 47 in which the step of calibrating includes determining the position at which the point of focus lies on the surface of the master based on the monitored variations of the interference signal.

49. The method of claim 45 including a step of further dividing the test beam into first and second sub-test beams, and the step of focusing the test beam includes focusing the first and second sub-test beams to different points of focus for separately measuring first and second surfaces of the test piece.

50. The method of claim 49 in which the step of adjusting the point of focus includes the sub-steps of positioning the point of focus of the first sub-test beam on the first surface of the test piece for measuring the first surface and positioning the point of focus of the second sub-test beam on the second surface of the test piece for measuring the second surface.

51. The method of claim 50 in which the step of retroreflecting the test beam includes retroreflecting the first and second sub-test beams from their respective points of focus on the surfaces of the test piece.

52. The method of claim 50 including a further step of separately detecting interference signals between the reference beam and the first and second sub-test beams according to which of the sub-test beams is positioned in focus on one of the first and second surfaces of the test piece.

53. The method of claim 45 including a further step of producing two beams of coherent light having different fundamental wavelengths and the step of dividing includes dividing each of the different wavelength beams into the test and reference beams.

54. The method of claim 53 including a step of simultaneously detecting the interference signals between the test and reference beam portions of each of the fundamental wavelengths.

55. The method of claim 54 including a step of combining the interference signals detected for both fundamental wavelengths to produce an interference signal having a sensitivity to surface variations equivalent to those of a wavelength longer than either of the two different fundamental wavelengths of coherent light.

56. The method of claim 55 in which the step of resolving phase ambiguities of the interference signal includes resolving phase ambiguities of the interference signal having a sensitivity to surface variations equivalent to those of a wavelength longer than either of the two different fundamental wavelengths of coherent light.

* * * * *